US012059815B2

(12) United States Patent
De Boer et al.

(10) Patent No.: US 12,059,815 B2
(45) **Date of Patent: *Aug. 13, 2024**

(54) BLADE SET AND HAIR CUTTING APPLIANCE

(71) Applicant: KONINKLIJKE PHILIPS N.V., Eindhoven (NL)

(72) Inventors: Arjen De Boer, Drachten (NL); Roel Alexander Rethmeier, Drachten (NL); Willem Maat, Rohel (NL); Martijn Frans Johan Nab, Drachten (NL); Marcus Franciscus Eijkelkamp, Peize (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 172 days.

This patent is subject to a terminal disclaimer.

(21) Appl. No.: 17/589,941

(22) Filed: Feb. 1, 2022

(65) Prior Publication Data

US 2022/0152852 A1 May 19, 2022

Related U.S. Application Data

(63) Continuation of application No. 16/617,026, filed as application No. PCT/EP2019/055247 on Mar. 4, 2019, now Pat. No. 11,267,148.

(30) Foreign Application Priority Data

May 8, 2018 (EP) .................................... 18171317

(51) Int. Cl.

| | |
|---|---|
| ***B26B 19/38*** | (2006.01) |
| ***B26B 19/06*** | (2006.01) |
| ***B26B 19/20*** | (2006.01) |

(52) U.S. Cl.
CPC ........ *B26B 19/3846* (2013.01); *B26B 19/063* (2013.01); *B26B 19/205* (2013.01)

(58) Field of Classification Search
None
See application file for complete search history.

(56) References Cited

U.S. PATENT DOCUMENTS

| | | | |
|---|---|---|---|
| 4,118,863 | A | 10/1978 | Sandy |
| 5,600,890 | A | 2/1997 | Leitner |

(Continued)

FOREIGN PATENT DOCUMENTS

| | | | |
|---|---|---|---|
| EP | 3566828 | A1 | 11/2019 |
| GB | 115455 | | 8/1934 |

(Continued)

OTHER PUBLICATIONS

International Search Report and Written Opinion Dated May 20, 2019 For International Application No. PCT/EP2019/055247 Filed Mar. 4, 2019.

*Primary Examiner* — Hwei-Siu C Payer

(57) ABSTRACT

A blade set for a hair cutting appliance includes a stationary blade and a cutter blade. The stationary blade has a blade base and a plurality of teeth extending from the blade base in a longitudinal direction. The teeth are arranged in a series alternating with tooth gaps therebetween, where the tooth gaps define hair entry slots. The teeth have a first side arranged to cooperate with the cutter blade to cut hair and a second side arranged as a skin-facing side. The teeth have processing edges at the first side at their longitudinal extension, where the smoothened processing edges have smoothened edge transitions.

17 Claims, 6 Drawing Sheets

(56) References Cited

U.S. PATENT DOCUMENTS

| | | | |
|---|---|---|---|
| 6,742,262 B2 | 6/2004 | Conair | |
| 9,027,252 B2 | 5/2015 | Moseman | |
| 9,789,617 B2 | 10/2017 | Stapelbroek | |
| 10,252,429 B2 | 4/2019 | Sablatschan | |
| 11,267,148 B2 | 3/2022 | De Boer | |
| 2003/0005585 A1 | 1/2003 | Rizzuto | |
| 2004/0016128 A1 | 1/2004 | Yanosaka | |
| 2011/0225830 A1 | 9/2011 | Moseman | |
| 2014/0102271 A1 | 4/2014 | Krenik | |
| 2015/0059187 A1 | 3/2015 | Krenik | |
| 2016/0236361 A1 | 8/2016 | Stapelbroek | |
| 2018/0009121 A1 | 1/2018 | Stapelbroek | |
| 2021/0046663 A1 | 2/2021 | De Boer | |
| 2022/0152852 A1* | 5/2022 | De Boer | B26B 19/205 |

FOREIGN PATENT DOCUMENTS

| | | |
|---|---|---|
| JP | 02142587 A | 5/1990 |
| JP | 2014124261 A | 7/2014 |
| WO | 2011115714 | 9/2011 |

* cited by examiner

BLADE SET AND HAIR CUTTING APPLIANCE

CROSS REFERENCE TO RELATED APPLICATIONS

This application is a continuation of U.S. application Ser. No. 16/617,026 filed Nov. 26, 2019, published as US 2021/0046663 A1 on Feb. 18, 2021, now U.S. Pat. No. 11,267,148, which is the U.S. National Phase application under 35 U.S.C. § 371 of International Application No. PCT/EP2019/055247 filed Mar. 4, 2019, published as WO 2019/214862 on Nov. 14, 2019, which claims the benefit of European Patent Application Number 18171317.3 filed May 8, 2018. These applications are hereby incorporated by reference herein.

FIELD OF THE INVENTION

The present disclosure relates to a blade set for a hair cutting appliance, comprising a stationary blade and a cutter blade, and to a hair cutting appliance equipped with a respective blade set.

BACKGROUND OF THE INVENTION

Hair cutting appliances, particularly electric hair cutting appliances, are generally known and may include trimmers, clippers and shavers, for instance. Electric hair cutting appliances may also be referred to as electrically powered hair cutting appliances. Electric hair cutting appliances may be powered by electric supply mains and/or by energy storages, such as batteries, for instance. Electric hair cutting appliances are generally used to shave or trim (human) body hair, in particular facial hair and head hair to allow a person to have a well-groomed appearance. Frequently, electric hair cutting appliances are used for cutting animal hair.

Typically, a blade set of a hair cutting appliance within the context of the present disclosure comprises a blade set arrangement involving a movable cutter blade (also referred to as cutter or cutter blade) and a stationary blade (also referred to as guard). A relative movement, particularly a relative reciprocating movement, between the stationary blade and the cutting blade causes the cutting action.

Typically, the stationary blade is the blade that is closer to the to-be-treated skin/scalp or hair portion than the cutter blade. Frequently, the stationary blade directly contacts the skin or scalp of the person (or animal) whose hair is to be cut. The stationary blade protects the skin against the fast-moving or fast-reciprocating cutter blade. Both the stationary blade and the cutter blade are normally provided with teeth comprising cutting edges which cooperate to cut hair in a scissor-like action.

U.S. Pat. No. 6,742,262 B2 discloses a hair clipper comprising a body with a tongue structure pivotally mounted to and supported by said body; a blade assembly detachably securable to said body and having at least a stationary blade and a reciprocating blade, each blade having a cutting edge; an actuator; and a control lever operatively connected to said actuator, wherein when said control lever is rotated, said actuator causes said cutting edge of said reciprocating blade to move relative to said cutting edge of said stationary blade so as to allow the hair cutting length to be adjusted, wherein said blade assembly has a pocket structure with a bracket for selectively and detachably engaging said tongue structure and thereby enabling said blade assembly to be detachably secured to said body.

As a result of this design, a relative position between tips of the movable blade and the stationary blade can be adjusted. This involves an adjustment of the cutting length, provided that the stationary blade is tapered towards the tip. The cutting length is defined by a present distance or spacing between the actually processed scalp or skin and the cutter blade, particularly a plane in which the cutting edges are arranged.

Generally, blade sets involving a stationary blade that cooperates with a movable blade to affect the hair cutting action are made from steel material which also involves that the stationary blades may be integrally shaped parts.

So as to expand the length adjustment range, so-called attachment combs may be provided which are typically made from plastic material. The attachment combs are placed on top of the stationary blade so as to increase the distance between the skin/scalp and the blade set. Hence, the plastic attachment combs are additional attachment parts that are generally arranged in a detachable fashion. The attachment combs are not involved in the scissor-like cutting action.

Major goals for the design of hair cutting appliances involve cutting performance, user-friendliness, skin-friendliness, ergonomics. and smooth cutting procedures. However, it has been observed that in some conventional appliances there may be a certain tendency of hair pulling when the hair cutting appliance is operated and at least partially laterally moved (that is, not perfectly parallel to the extension of the cutting edges at the stationary blade and the cutter blade teeth). This may cause discomfort and harm.

In some cases, if the distance between the cutter tip and the guard is too large, a sharp edge on the teeth of the guard may cause hair pulling. This may lead to a certain discomfort for the user and should thus be avoided, at least in some embodiments.

A general design goal for blade sets is to improve cutting performance and to reduce skin injuries, such as skin irritations, redness, skin domes or bulges, etc. Further, the hair removal capacity is a relevant key issue in the design and performance of cutting units.

There is thus still room for improvement in the design of and manufacturing approaches for stationary blades of hair cutting appliances.

SUMMARY OF THE INVENTION

It is an object of the present disclosure to provide a blade set for a hair cutting appliance that improves the user's comfort during hair cutting procedures, while maintaining the cutting performance. Preferably, the blade set enables a reduction of skin injuries, for instance due to excessive hair pulling prior to the cutting operation.

Hence, it is an object of the present disclosure to provide for improvements in the design of hair cutting appliances, which address at least some of the above-mentioned issues. More particularly, it is desirable to present a blade set that is skin-friendly, robust, and that also provides for a sufficient cutting performance. It is also desirable to arrive at an even further improved cutting smoothness.

Hence, it is also desirable to present a shaving unit that is arranged in such a way that hair manipulating prior to hair cutting is facilitated by avoiding hair pulling which may cause skin injuries and a certain discomfort for the user.

In accordance with a first aspect of the present disclosure, there is presented a blade set for a hair cutting appliance, comprising a stationary blade and a cutter blade the stationary blade comprising a blade base, and a plurality of teeth extending from the blade base in a longitudinal direction, wherein the teeth are arranged in a series alternating with tooth gaps therebetween, the tooth gaps defining hair entry slots, wherein the teeth comprise a first side arranged to cooperate with a cutter blade to cut hair and a second side arranged as a skin-facing side, wherein the teeth comprise at the first side at their longitudinal extension processing edges, and wherein the processing edges comprise smoothened edge transitions, the cutter blade comprising a plurality of cutter blade teeth extending in a longitudinal direction, wherein the cutter blade is provided at the cutter blade teeth with sharp cutting edges in a processing zone that are arranged to cooperate with the smoothened processing edges of the stationary blade to cut hair therebetween.

The present invention is based on the insight that the cutting edges (processing edges) at the teeth of the stationary blade may be at least slightly smoothened to improve the user comfort and to reduce hair pulling during the hair cutting operation. It is to be noted that it is still the main purpose of the smoothened edges to act as a cutting edge in the cutting operation between the stationary blade and the cutter blade.

However, it has been observed that providing those edges with excessively sharp transitions may have an adverse effect on the user's comfort. In a worst-case scenario, hairs are torn out by a lateral movement of the blade set that is equipped with a respective stationary blade as the overly sharp edges engage and pull single hair filaments laterally.

Preferably, the blade set is to be used in a cutting head for a hair cutting appliance that is provided with a so-called tip-to-tip adjustment feature to adjust the cutting length. It has been observed that particularly when a considerably long cutting length is defined (that is, 6 mm, 9 mm or even more) there is a certain tendency of a pulling engagement of at least some hair filaments by the overly sharpened stationary blade cutting edges. Hence, the hair filaments may not just slide over the cutting edges but would be considerably pulled as the edges engage the filaments like an axe blade.

It is to be noted in this context that already a slight minute smoothening may address this issue while maintaining the hair cutting performance between cooperating cutting edges of the teeth of the stationary blade and the cutter blade.

A mean diameter of a single "standard" hair filament is for instance about 80 μm. Hence, the dimension of the smoothening is generally smaller than that of a "standard" hair cross-section. However, the foregoing is not to be understood in a limiting sense.

In other words, rounding and chamfering for the smoothened edge transitions as discussed herein is generally not in the millimeter-range but in the micrometer-range, for instance.

The stationary blade may also be referred to as guard blade. The cutter blade may also be referred to as a movable blade. Generally, the second, skin-facing side and the first, opposite side of the teeth are not necessarily parallel but may be somewhat inclined to one another. Accordingly, in certain embodiments, the stationary blade is provided with wedge-shaped teeth so that a length-adjustment capacity is provided. The first side may also be referred to as bottom side. The second side may also be referred to as top side.

In an exemplary embodiment the stationary blade of the blade set, the smoothened edge transitions comprise chamfered edges. By way of example, a length of the resulting edge leg of the chamfer (e.g., a projected length to the first side) may be in the range of about 5 to 50 μm (micrometer), preferably in the range of 10 to 40 μm, more preferably in the range of 15 to 30 μm. Hence, in a macroscopic view, the cutting edges are still sufficiently sharp to cut hair in cooperation with the cutting edges of the cutter blade. Chamfered edges may also be referred to as bevels.

The chamfering may involve a 45° inclination of the resulting leg produced by the edge removal with respect to the second side (bottom side) surface of the blade set. Such a 45° inclination includes a first angle of 135° between a bottom surface and the surface of the chamfer, and a second angle of 135° between the surface of the chamfer and a side surface of the teeth.

However, in alternative embodiments, the chamfer is not inclined at 45° with respect to the second side but somewhat steeper, for instance in the range of between (greater than) 45° to 75° with respect to the second side, preferably in the range of between 55° and 70°. Hence, a resulting first angle between the bottom surface and the surface of the chamfer would be smaller than a corresponding second angle between the surface of the chamfer and a side surface of the teeth. The side surface of the teeth and the bottom surface are generally arranged at an angle of approximately 90° with respect to one another.

In another exemplar embodiment of the stationary blade of the blade set, the smoothened edge transitions comprise rounded edges. This may involve a standard rounding to form a transition between the neighboring bottom surface and the side surface of the teeth. Rounded edges may also be referred to as fillets.

In still another exemplary embodiment of the stationary blade of the blade set, the rounded edges have an edge radius in a range of 5 to 50 μm, preferably in a range of 10 to 40 μm, more preferably in a range of 15 to 30 μm. Hence, in a macroscopic view, the cutting edges are still sufficiently sharp to cut hair in cooperation with the cutting edges of the cutter blade.

Needless to say, also a combination of chamfered edges and rounded edges, and also hybrid forms may be envisaged according to further exemplary embodiments.

It is to be noted in this context that forming the smooth edge transition too large may result in another, different hair-pulling phenomenon when hair filaments are clamped between the stationary blade teeth and the cutter blade teeth instead of being cut therebetween.

Further, as indicated above, the edge transitions are generally in the micrometer range. This involves specific manufacturing approaches, involving electrochemical machining (ECM), for instance. Hence, in a microscopic view, also hybrid edge transitions may be present which involve both rounding features and chamfer features.

In yet another exemplary embodiment of the stationary blade of the blade set, the smoothened edge transitions comprise in a transition zone a first edge involving an obtuse angle and a second edge formed involving an obtuse angle. An obtuse angle is a form of angle that measures wider than 90° and less than 180°. The first angle at the first edge and the second angle at the second edge may have the same dimension or may be different from one another. Hence, the edge smoothening may be non-symmetric with respect to the imaginary edge.

In still another exemplary embodiment of the stationary blade of the blade set, the smoothened edge transitions comprise in a transition zone a first edge formed by an obtuse angle and a second edge formed involving a rounding. Also in this way, a smooth transition may be provided at the cutting edge.

In yet another exemplary embodiment of the stationary blade of the blade set, the smoothened edge transitions comprise in a transition zone a first edge involving a rounding and a second edge involving a rounding. Hence, at the transition between the bottom surface and the side surface, a non-constant rounding or non-circular rounding may be formed. By way of example, the rounding may have, in a cross-sectional view, the form of a segment of an ellipse.

In still another exemplary embodiment of the stationary blade of the blade set, the smoothened edge transitions are provided in a processing zone of the longitudinal extension of the smoothened processing edges. As indicated above, when a tip-to-tip adjustment is possible for the blade set involving the stationary blade, the (longitudinally extending) processing zone at the teeth of the stationary blade may be greater than a corresponding (longitudinally extending) processing zone at the teeth of the cutter blade. In such a case, the processing zone enables a length adjustment, i.e., a longitudinal shift between the stationary blade and the movable cutter blade.

The smoothened edge transitions reduce the risk of hair pulling due to lateral movements of the stationary blade. Hence, it is beneficial to form a respective smoothening not only in a portion of the cutting edge of the stationary blade teeth that is currently cooperating with cutter blade teeth, but also in further, wider portions. The reason for this is that hair pulling as discussed herein does not necessarily require an influence of the cutter blade, but is mainly attributable to sharp edges at the stationary blade teeth.

In yet another exemplary embodiment of the stationary blade of the blade set, the teeth are tapered and provide a length adjustment range of at least 3.0 mm, preferably of at least 5.0 mm, further preferred of at least 10.0 mm. In certain embodiments, the length adjustment range is up to 12.0 mm. Length adjustment is an adjustment of the (vertical) thickness of the stationary blade in the current cutting zone. Hence, a certain length value adjustment requires a corresponding (longitudinal) displacement between the stationary blade and the cutter blade.

In another exemplar embodiment of the blade set, the stationary blade and the cutter blade are arranged to be displaced with respect to one another in the longitudinal direction to set a cutting length of the appliance. Hence, the blade set may be suitable for a hair cutting appliance comprising a tip-to-tip adjustment feature.

In yet another aspect of the present disclosure there is presented a hair cutting appliance, particularly a trimmer or clipper, comprising a housing, a cutting head comprising a blade set that involves a stationary blade and a cutter blade, wherein the stationary blade and the cutter blade are arranged to be moved with respect to one another to cut hair, and preferably a cutting length adjustment mechanism arranged to set a relative position between teeth of the stationary blade and teeth of the cutter blade so as to define a cutting length, wherein the stationary blade is arranged in accordance with at least one embodiment as discussed herein.

Preferably, a cutting length adjustment mechanism for the blade set is provided. The adjustment mechanism may also adjust and set a tip-to-tip distance between tip portions of the stationary blade and a movable cutter blade of the blade set. Generally, the appliance may be arranged as a hair clipper and/or a beard trimmer.

Preferably, the hair cutting appliance is a hand-held electrically powered hair cutting appliance. Typically, the hair cutting appliance comprises an elongated housing and a cutting head at a top end thereof where the blade set is provided. Typically, the blade set comprises at least one stationary blade and at least one movable cutter blade that is operable to be moved with respect to the stationary blade to cut hair. The elongated housing further comprises a bottom end which is opposite to the top end thereof. Further, a front side and a rear side are provided. When the hair cutting appliance is in operation, typically the top side, where the blade set is arranged, contacts the to-be-groomed skin portion in a direct or mediate (i.e., via an attachment comb) fashion. The front side is typically facing the skin portion, when the appliance is in use. Consequently, the rear side is typically facing away from the skin when the hair cutting appliance is in operation.

Exemplary embodiments of the invention are defined in the dependent claims. It shall be understood that the claimed of manufacturing method, hair cutting appliance and blade set may have similar and/or identical preferred embodiments as the claimed stationary blade discussed herein, in particular as defined in the dependent claims and as disclosed herein.

BRIEF DESCRIPTION OF THE DRAWINGS

These and other aspects of the disclosure will be apparent from and elucidated with reference to the embodiments described hereinafter. In the following drawings

DETAILED DESCRIPTION OF THE EMBODIMENTS

Figure 1:
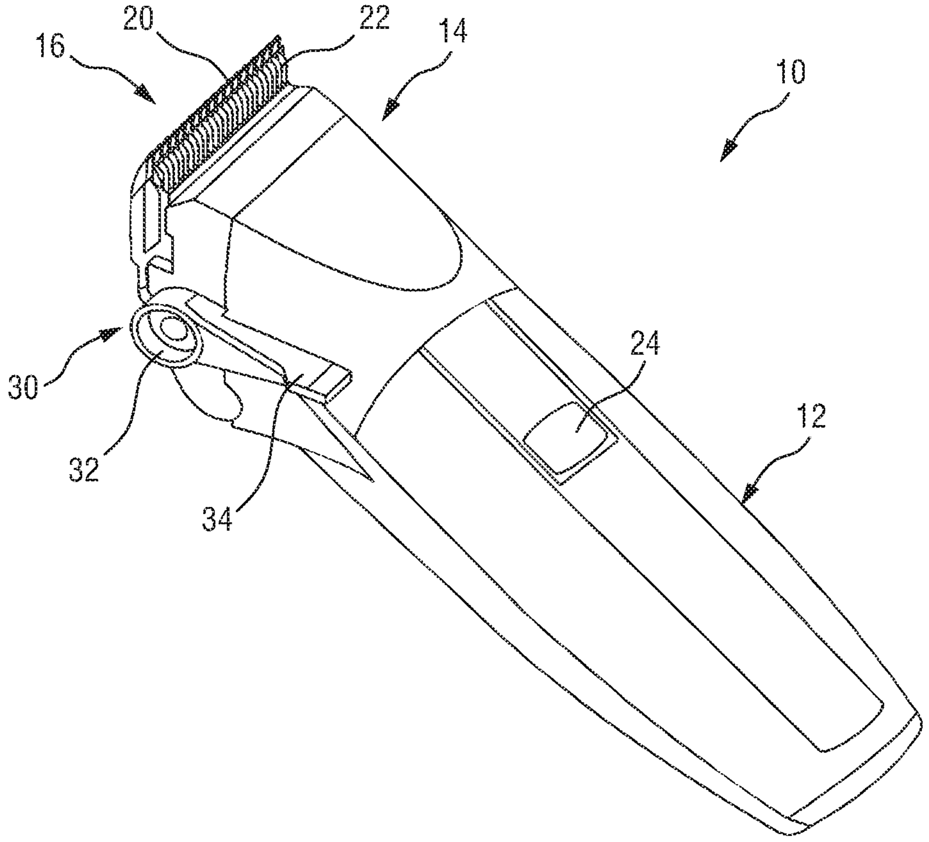
FIG. 1 shows a schematic perspective view of an exemplary embodiment of an electric hair cutting appliance arranged as a hair clipper or hair trimmer.

FIG. 1 shows a schematic perspective view of a hair cutting appliance 10, particularly an electrically operated hair cutting appliance 10. The appliance 10 may also be referred to as hair clipper or hair trimmer. The appliance 10 comprises a housing or housing portion 12 having a generally elongated shape. At a first, top end thereof, a cutting head 14 is provided. The cutting head 14 comprises a blade set 16. The blade set 16 comprises a stationary blade 20 and a movable cutter blade 22 that may be moved with respect to each other to cut hair. At a central portion and a second, bottom end of the housing 12, a handle or grip portion is formed. A user may grasp or grab the housing 12 at the grip portion.

The appliance 10 in accordance with the exemplary embodiment of FIG. 1 further comprises operator controls. For instance, an on-off switch or button 24 may be provided.

For illustrative purposes, the housing 12 of the hair cutting appliance 10 comprises a top side, where the blade set 16 is mounted, a bottom side that is opposite to the top side, a front side which typically faces the skin of the to-be-groomed subject when the appliance 10 is in operation, and a rear side that is opposite to the front side. These and other positional and/or directional indications shall not be construed as limiting the scope of the disclosure.

Hair cutting appliances are known that implement an adjustment mechanism 30 for the blade set. The adjustment mechanism 30 may be manually operated or motor powered. Generally, the adjustment mechanism 30 may be arranged as a tip-to-tip adjustment mechanism that sets and adjusts a distance between the tips of the stationary blade 20 and the cutter blade 22. Hence, an offset in the frontal direction between toothed leading edges of the stationary blade 20 and the cutter blade 22 may be adjusted. When the stationary blade 20 is at least partially tapered towards the frontal end, the tip-to-tip adjustment also involves a cutting length adjustment.

As can be further seen from FIG. 1, the adjustment mechanism 30 comprises an actuator element 32 which is exemplarily arranged as an operator lever 34. The operator lever 34 is operatively coupled with the blade set 16 so as to adjust the relative position between the stationary blade 20 and the cutter blade 22.

Figure 2:
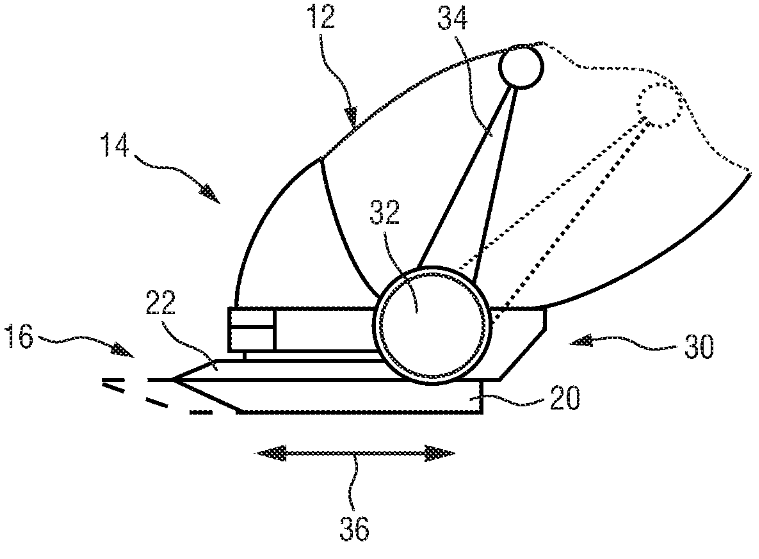
FIG. 2 shows a simplified schematic side view of an exemplary embodiment of a cutting length adjustment mechanism for a hair cutting appliance.

Further reference in this context is made to FIG. 2, schematically illustrating an operation of an adjustment mechanism 30. FIG. 2 shows a simplified view of a cutting head 14 of a hair cutting appliance 10. At or adjacent to the cutting head 14, the appliance 10 is provided with the adjustment mechanism 30 that involves an actuator element 32 which is arranged as an operator lever 34. The operator lever 34 can be moved between a first state and a second state. In FIG. 2, the first state is indicated by continuous lines. The second state is indicated by dashed lines. The first state is associated with a first, retracted state of the stationary blade 20. The second state is associated with a second, extracted state of the stationary blade 20 which is indicated in FIG. 2 by dashed lines. A double arrow designated by reference numeral 36 indicates the adjustment movement between the stationary blade 20 and the cutter blade 22. Hence, a distance between the leading edges of the stationary blade 20 and the cutter blade 22 can be adjusted which involves a cutting length adjustment, as the stationary blade 20 is slightly tapered towards the frontal end.

In accordance with at least some embodiments and aspects of the present disclosure, novel approaches to the design and manufacturing of stationary blades 20 for blade sets 16 of hair cutting appliances 10 are presented and will be further described hereinafter.

In this context, reference is made to FIGS. 3 to 15 which illustrate exemplary embodiments of a stationary blade 20. The stationary blade 20 may form part of an adjustable blade set 16 that is arranged to be adjusted by an adjustment mechanism 30 as shown in FIG. 1 and FIG. 2. The stationary blade 20 is particularly suited for blade sets 16 of hair clippers that implement an integrated tip-to-tip or cutting length adjustment.

For illustrative purposes, the stationary blade 20 and the blade set 16 will be described herein with reference to main orientations and directions. It should be understood that the direction and orientation indications shall not be construed as limiting the scope. Rather, the skilled person can readily convert or transfer the indications when being confronted with alternative embodiments, views and orientations.

An end of the blade set 16 to which the tips of the teeth point will be referred to as front side or frontal end. At the frontal end, the teeth of the stationary blade 20 and the movable cutter blade 22 define respective leading edges. An opposite side facing away from the front side will be referred to herein as rear side or rear end.

Further, a side of the blade set which is facing the skin and which comes into contact with the skin will be referred to herein as top side. An opposite side facing away from the top side will be referred to herein as bottom side. At the level of the blade set 16, the stationary blade 20 is arranged at the top side. The movable cutter blade 22 is arranged at the bottom side. As the stationary blade 20 may be at least partially tapered along the longitudinal extension of respective teeth, the top side and the bottom side are not necessarily perfectly parallel to one another, but may be at least slightly inclined with respect to one another. The two remaining sides may be referred to as lateral sides.

Figure 3:
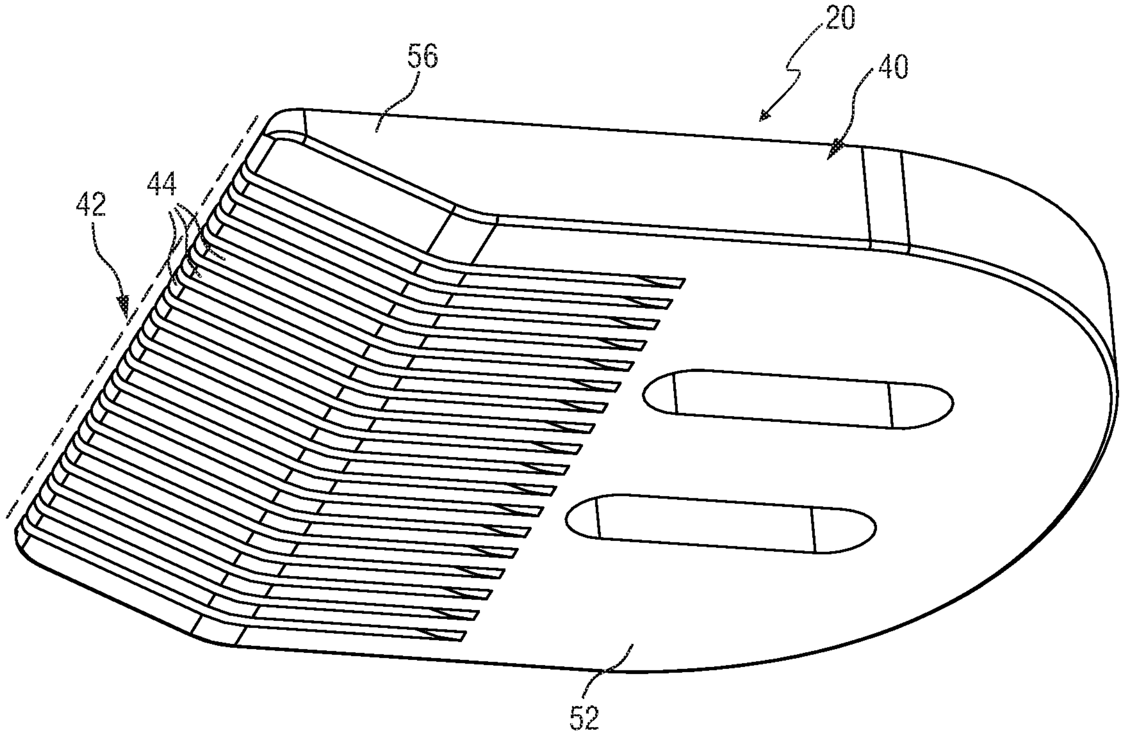
FIG. 3 shows a perspective simplified top view of a stationary blade for a hair cutting appliance.
Figure 4:
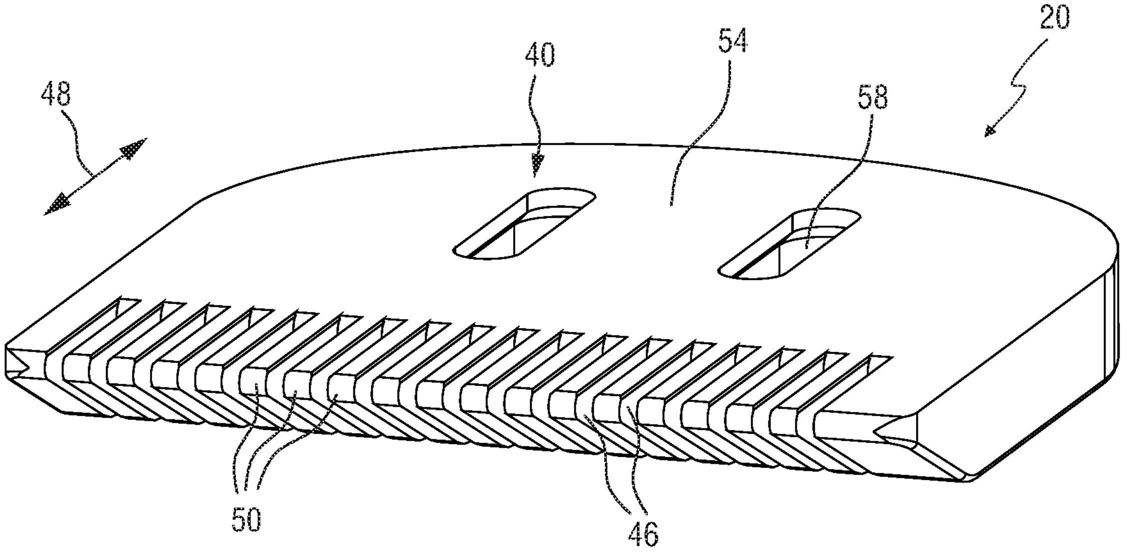
FIG. 4 shows a perspective simplified bottom view of the stationary blade illustrated in FIG. 3.

With reference to FIG. 3 and FIG. 4, an exemplary embodiment of a stationary blade 20 is illustrated in a perspective top view (FIG. 3) and a perspective bottom/front view (FIG. 4). The stationary blade 20 comprises a blade base 40. At the frontal and of the stationary blade 20, a leading edge 42 is formed by a series of stationary blade teeth 44 extending from the base 40 in a longitudinal direction, refer to the double-arrow 48 indicating the longitudinal direction/longitudinal extension.

In the embodiment illustrated in accordance with FIGS. 3 and 4, the leading edge 42 is a basically linear leading edge. The stationary blade teeth 44 alternate with slots or gaps 46 formed therebetween. The leading edge 42 is defined by respective tips 50 of the teeth 44.

In FIG. 3, a top side 52 is shown. In FIG. 4, a bottom side 54 is shown. As used herein, the top side 52 may also be referred to as skin-facing side or second side. As used herein, the bottom side 54 may also be referred to as first side or cutter-facing side.

The teeth 44 form a linear series, whereas a basically parallel orientation between neighboring teeth 44 is present. However, this shall not be understood to be limiting. Rather, also alternative embodiments may be envisaged that include a certain angular offset between neighboring teeth 44 in such a way that the leading edge 42 defined by the teeth 44 is somewhat curved or even circular.

Further, as can be seen in FIG. 3, the teeth 44 are tapered in a frontal portion of the longitudinal extension 48, adjoining the tips 50. The tapered portion/wedge shape is indicated in FIG. 3 by reference numeral 56. Hence, when a tip-to-tip adjustment mechanism is present, refer to 30 in FIG. 2, the cutting length may be adjusted accordingly. For length adjustment, so-called length adjustment slots 58 are formed in the blade base 40.

Figure 5:
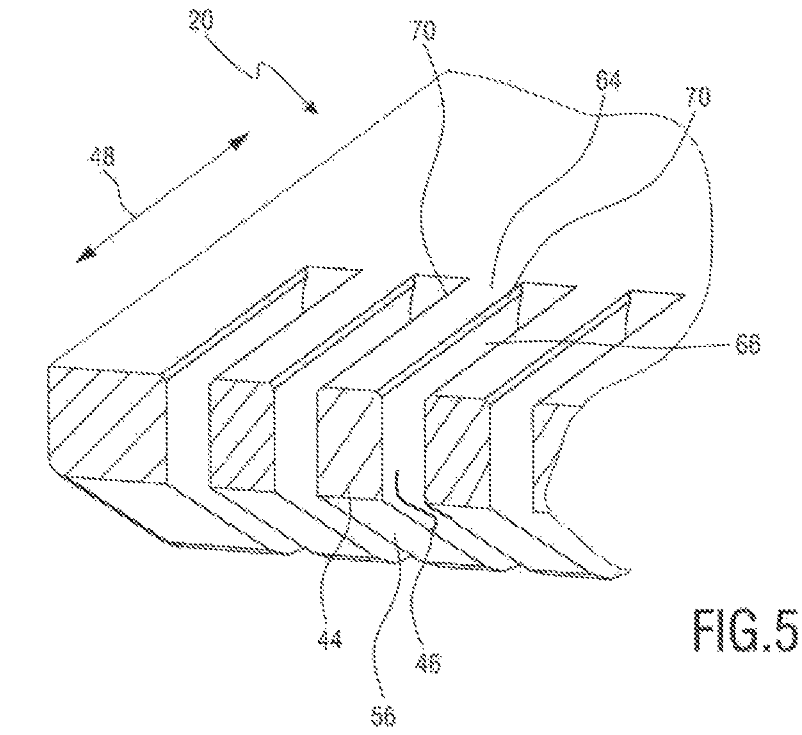
FIG. 5 shows a cross-sectional perspective frontal bottom view of a stationary blade having chamfered edge transitions at the teeth thereof.
Figure 6:
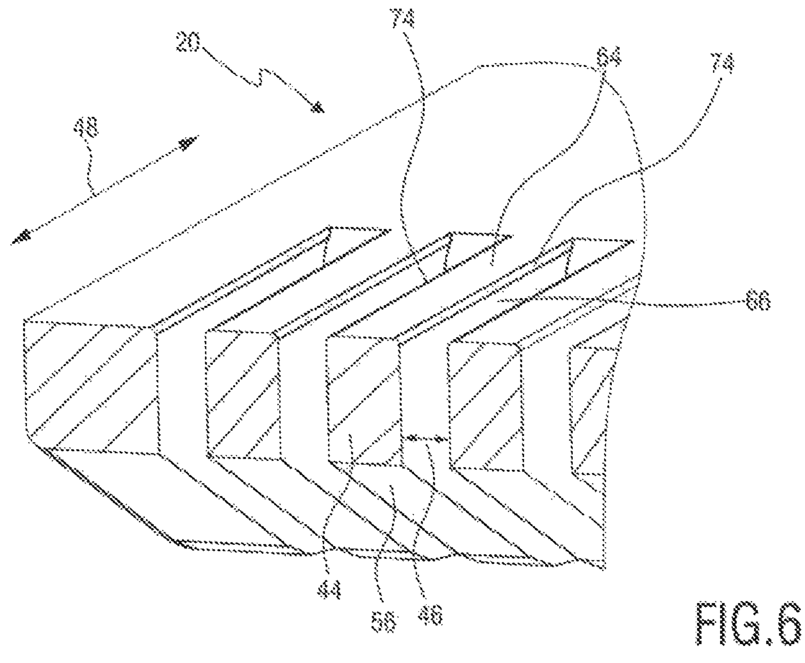
FIG. 6 shows a cross-sectional perspective frontal bottom view of a stationary blade having rounded edge transitions at the teeth thereof.

Further reference is made to FIG. 5 and FIG. 6, illustrating two major embodiments that are formed in accordance with general aspect of the present disclosure. FIG. 5 and FIG. 6 show perspective cross-sectional detail views of the arrangement of the stationary blade 20 illustrated in FIG. 4. Hence, also a cross-sectional view through the teeth 44 of the stationary blade 20 is provided.

In FIG. 5, the teeth 44 comprise a bottom surface 64 which may also be referred to as first surface herein. The bottom surface 64 is associated with or basically belonging to the bottom side 54. In other words, the bottom surface 64 faces the teeth of the cutter blade 22 when a respectively equipped appliance 10 is operated. Further, the teeth 44 comprise side surfaces 66 which may also be referred to as second surfaces herein. The side surfaces 66 of two neighboring teeth 44 define therebetween a tooth gap 46.

It is to be noted in this context that the bottom surface 64 as illustrated in several Figures herein is actually shown at a top portion of the Figures. However, as explained above, the bottom surface 64 is opposite to the top side of the stationary blade 20 that is facing the user's skin when the appliance 10 is operated.

At the transitions between the bottom surface 64 and the side surfaces 66, the teeth 44 are provided with smoothened edges 70. Generally, the smoothened edges 70 may be referred to as cutting or processing edges that cooperate with opposite cutting edges of the teeth of the cutter blade 22

However, in accordance with the present disclosure, it is proposed to provide a tiny smoothening at the edges 70. In FIG. 5, the smoothened edges 70 are chamfered or beveled. In other words, imaginary sharp edges at the intersection between the bottom surface 64 and the side surfaces 66 are removed and replaced by a chamfer.

Similarly, FIG. 6 shows a corresponding embodiment of smoothened edges 74 between the bottom surface 64 and side surfaces 66 of the teeth 44 of the stationary blade 20. The smoothened edges 74 of the embodiment illustrated in FIG. 6 are rounded, i.e., radiused and/or provided with fillets between the bottom surface 64 and the side surfaces 66.

It is to be noted in this context that the smoothened edge transitions illustrated in at least some of the Figures described herein are shown in an exaggerated state for illustrative purposes. As indicated above, the edge transitions—including fillets, chamfers/bevels, and hybrids therebetween, etc.—are generally in the micrometer-range rather than in the millimeter-range.

The dimensions of the smoothened edge transitions (radius, edge length, etc.) may be in the order of less than 200 μm (micrometer), preferably of less than 100 μm, more preferably of less than 50 μm. By way of example, the smoothened edge transitions include cross-sectional dimensions (radius, projected length, etc.) in the range of about 5 to 50 μm (micrometer), preferably in the range of 10 to 40 μm, more preferably in the range of 15 to 30 μm.

Hence, cutting edges 70, 74 at the stationary blade 20 are still sufficiently sharp to cut hair in cooperation with corresponding cutting edges of the teeth of the cutter blade 22. However, hair-pulling is significantly reduced as the smoothened edges 70, 74 are no longer sharp enough to engage and pull a hair filament when the stationary blade 20 is laterally slighted along the skin. At least the likelihood for hair-pulling due to overly sharp edges at the stationary blade 20 is significantly reduced.

It is also proposed in accordance with the present disclosure to make the smoothening of the cutting edges 70, 74 not too large to avoid pinching of hairs between the opposite teeth of the stationary blade 20 and the cutter blade 22. Hence, the smoothening dimension is preferably in a certain range, as indicated above.

Figure 7:
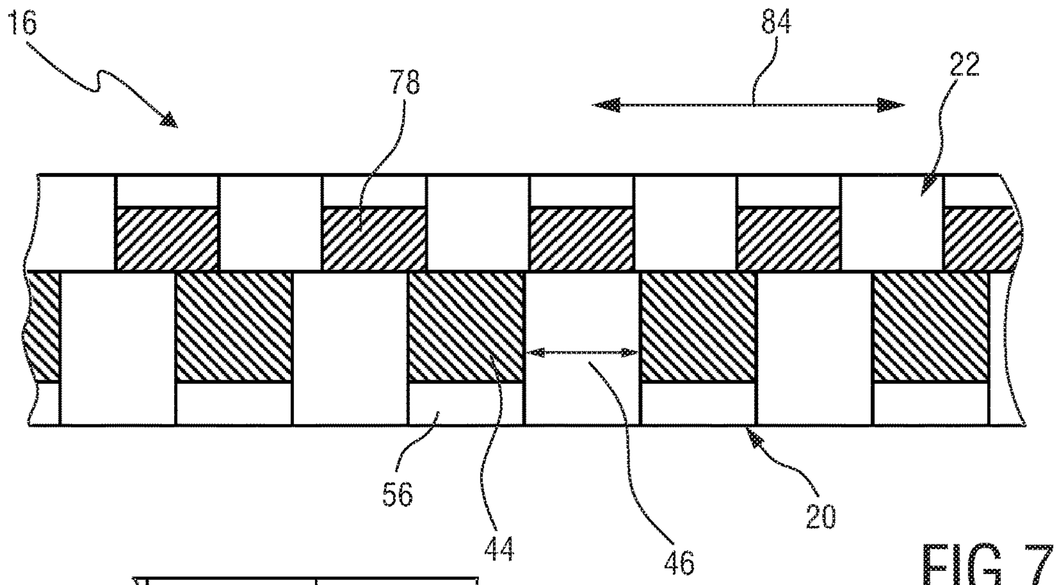
FIG. 7 shows a simplified schematic cross-sectional frontal view of a blade set for a hair cutting appliance.
Figure 8:
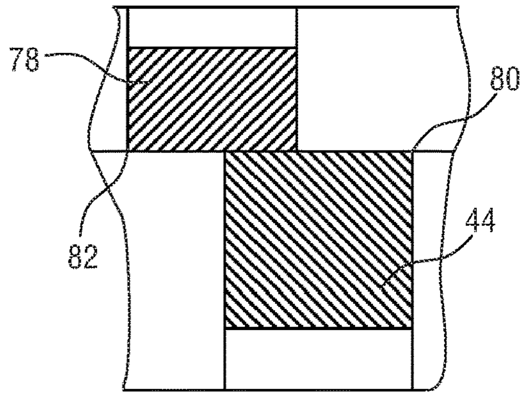
FIG. 8 shows an enlarged partial view of the arrangement of FIG. 7.

With reference to FIGS. 7 to 10, the cooperation between the stationary blade 20 and the cutter blade 22 is illustrated and explained. FIG. 7 and FIG. 8 each involve a partial frontal cross-sectional view of a cutting zone of a blade set 16 that is composed of a stationary blade 20 and a cutter blade 22. FIG. 8 is an enlarged view of a portion of the arrangement of FIG. 7.

The stationary blade 20 and the cutter blade 22 form a blade set 16. The stationary blade 20 comprises a series of teeth 44 alternating with gaps 46 therebetween. Reference numeral 56 indicates a tapering at the skin-facing side of the teeth 44. The cutter blade 22 comprises a series of cutter blade teeth 78 that cooperate with the stationary blade teeth 44. When the blade set 16 is operated, the cutter blade 22 is moved with respect to the stationary blade 20 in a lateral direction, refer to the double-arrow 84.

In FIG. 8, cutting edges of the stationary blade teeth 44 are indicated by 80 and cutting edges of the cutter blade teeth 78 are indicated by 82. When the blade set 16 is operated, the cutting edges 80, 82 cooperate with one another in a scissor-action to cut hair filaments therebetween. In accordance with the present disclosure, the cutting edges 80 of the stationary blade teeth 44 are at least partially smoothened.

Figure 9:
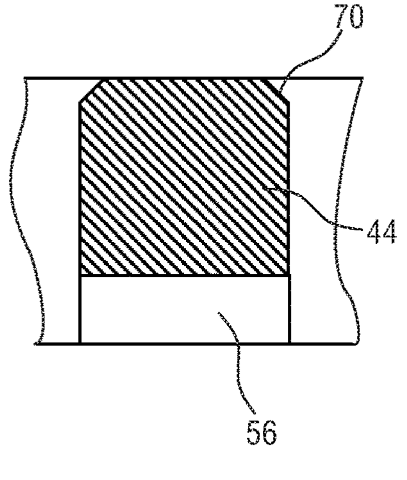
FIG. 9 shows a simplified schematic partial cross-sectional frontal view of a tooth of a stationary blade that is provided with chamfered edges.
Figure 10:
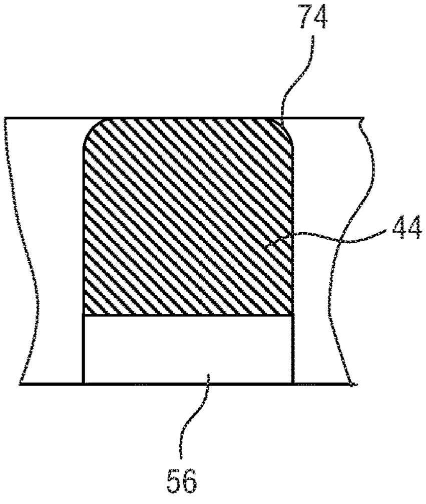
FIG. 10 shows a simplified schematic partial cross-sectional frontal view of a tooth of a stationary blade that is provided with rounded edges.

FIG. 9 is a cross-sectional frontal view of a stationary blade tooth 44 that is provided with chamfered edges 70, refer also to FIG. 5. FIG. 10 is a corresponding cross-sectional frontal view of a stationary blade tooth 44 that is provided with rounded edges 74, refer also to FIG. 6. Again, it is to be noted that the dimension of the smoothened edges 70, 74 shown in FIGS. 9 and 10 is somewhat exaggerated for illustrative purposes.

Further reference is made to FIGS. 11 to 15, illustrating by means of partial cross-sectional views several embodiments of edge transitions for the stationary blade cutting edges in accordance with the present disclosure.

Figure 11:
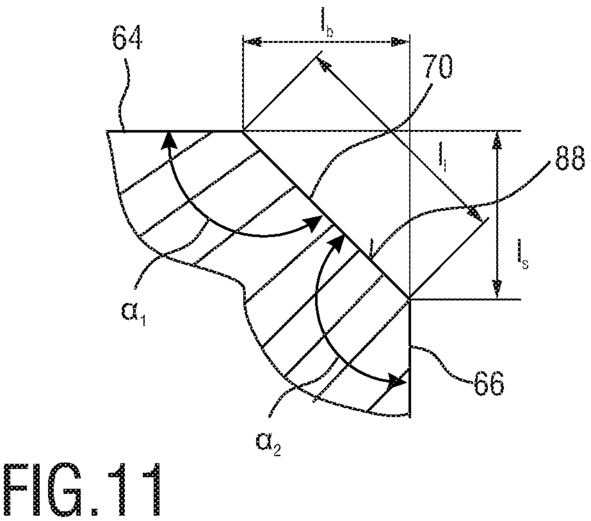
FIG. 11 shows simplified schematic partial cross-sectional view of an edge of a stationary blade tooth in accordance with the present disclosure.

In FIG. 11, there is shown a smoothened edge 70 comprising a chamfering or bevel between a bottom surface 64 and a side surface 66. Hence, this respect, FIG. 11 corresponds to the embodiment already illustrated in FIGS. 5 and 9.

Reference numeral 88 indicates a leg of the chamfered smoothened edge 70. In FIG. 11, there are indicated several dimensions to explain the shape and size of the smoothened edge 70.

An angle $\alpha_1$ (alpha$_1$) characterizes an inclination between the bottom surface 64 and the leg 88. An angle $\alpha_2$ (alpha$_2$) characterizes an inclination between the leg 88 and the side surface 66. Generally, between the bottom surface 64 and the side surface 66, an inclination angle of about 90° is present.

In accordance with the exemplary embodiment illustrated in FIG. 11, the angle $\alpha_1$ is at about 135° which as a consequence that also the angle $\alpha_2$ is at about 135°. Hence, a sharp cutting edge between perpendicular surfaces has been replaced by two blunt or obtuse angles $\alpha_1$, $\alpha_2$. Needless to say, also slightly deviating values for the angles involved may be used.

In FIG. 11, a length of the leg 88 of the chamfered edge 70 is indicated by $l_l$. A projected length in the plane of the bottom surface 64 is indicated by $l_b$. A projected length in the plane of the side surface 66 is indicated by $l_s$.

As discussed above, in accordance with at least some embodiments, the lengths $l_b$ and $l_s$ are in the range of between 5 and 50 μm (micrometer). The resulting length of the leg 88 may be calculated accordingly.

Figure 12:
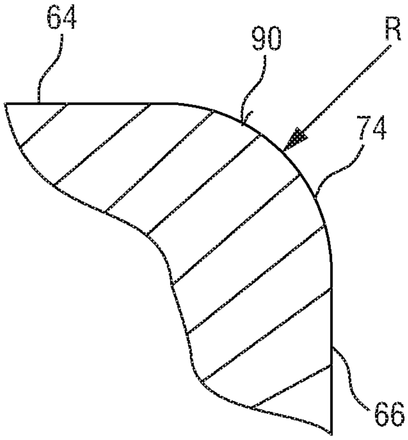
FIG. 12 shows another simplified schematic partial cross-sectional view of an edge of a stationary blade tooth in accordance with the present disclosure.

In FIG. 12, there is shown a smoothened edge 74 comprising a rounding or fillet between a bottom surface 64 and a side surface 66. Hence, in this respect, FIG. 12 corresponds to the embodiment already illustrated in FIGS. 6 and 10. The smoothened edge 74 is characterized by an edge radius R. The radius is basically constant and thus provides for a tangential transition between the bottom surface 64 and the side surface 66 that are basically perpendicular to one another.

As discussed above, in accordance with at least some embodiments, the radius R is in the range of between 5 and 50 μm (micrometer). Between the bottom surface 64 and the side surface 66, a fillet 90 having the radius R is formed, the fillet including a tangential transition to the top surface 64 and the side surface 66, and a basically constant curvature therebetween.

In certain embodiments, the smoothened edge transition is present along the entire or nearly entire longitudinal extension (reference numeral 48 in FIGS. 5 and 6) of the teeth 44 between the tips 50 and the blade base 40.

As already explained further above, when a tip-to-tip adjustment mechanism is provided (reference numeral 30 in FIGS. 1 and 2), the longitudinal extension 48 of the stationary blade teeth 44 is greater than the longitudinal extension of the cutter blade teeth 78. In the embodiment illustrated in FIG. 11 in FIG. 12, the shape of the smoothened edges 70, 74 is, so to say, symmetric with respect to an imaginary central plane arranged at an angle of about 45° with respect to both the bottom surface 64 and a side surface 66.

Further, it is to be noted that the bottom surface 64 and a side surface 66 are not necessarily perfectly even and curvature-free.

Figure 13:
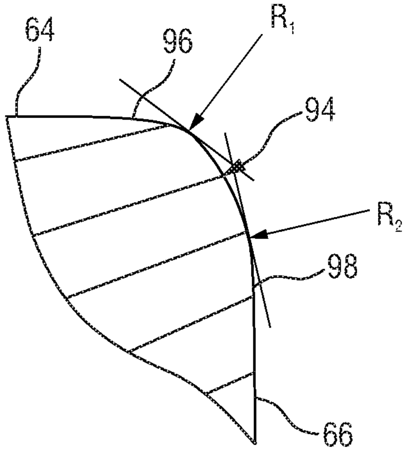
FIG. 13 shows yet another simplified schematic partial cross-sectional view of an edge of a stationary blade tooth in accordance with the present disclosure.
Figure 14:
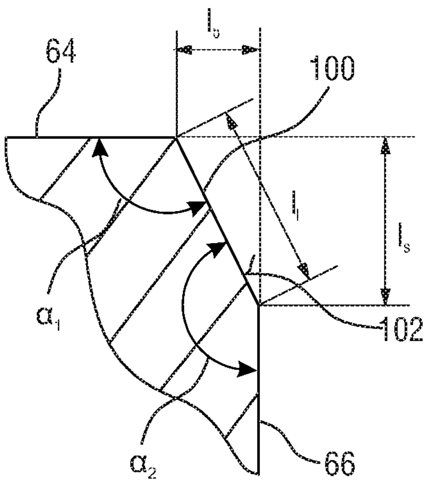
FIG. 14 shows yet another simplified schematic partial cross-sectional view of an edge of a stationary blade tooth in accordance with the present disclosure.
Figure 15:
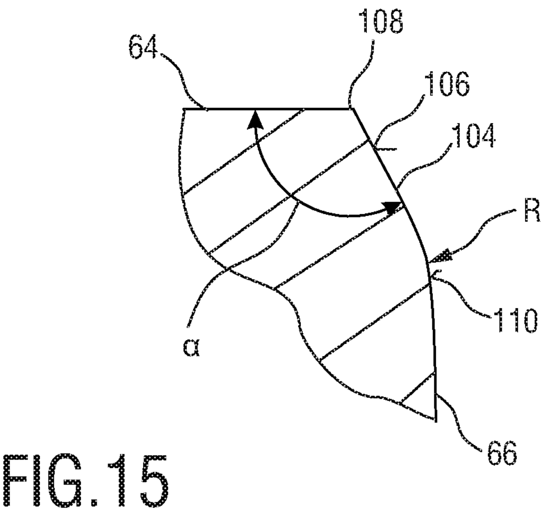
FIG. 15 shows yet another simplified schematic partial cross-sectional view of an edge of a stationary blade tooth in accordance with the present disclosure.

FIGS. 13, 14 and 15 illustrate alternative shapes of the chamfered edge transitions that are non-symmetric with respect to an imaginary central plane arranged at an angle of about 45° with respect to both the bottom surface 64 and a side surface 66.

In FIG. 13, a smoothened edge transition 94 having a non-constant curvature is illustrated. Adjacent to the bottom surface 64, a first fillet portion 96 having a first radius $R_1$ is present. Adjacent to the side surface 66, a second fillet portion 98 having a second radius $R_2$ is present. By way of example, the first radius $R_1$ is smaller than the second radius $R_2$.

The exemplary embodiment of FIG. 14 may be combined with the embodiment of FIG. 11 to further smoothen the remaining edges of the chamfering.

In certain embodiments, also the smoothened transition 94 provides for a tangential transition between the top surface 64 and the side surface 66.

In FIG. 14, a chamfered smoothened edge 100 is illustrated. The smoothened edge 100 comprises a leg 102 that is not arranged at basically the same angle of inclination with respect to the bottom surface 64 in the side surface 66. In other words, an angle $\alpha_1$ ($alpha_1$) characterizing an inclination between the bottom surface 64 and the leg 102 is smaller than angle $\alpha_2$ ($alpha_2$) characterizing an inclination between the leg 102 and the side surface 66.

In FIG. 14, a length of the leg 102 of the chamfered edge 100 is indicated by $l_l$. A projected length in the plane of the bottom surface 64 is indicated by $l_b$. A projected length in the plane of the side surface 66 is indicated by $l_s$.

In FIG. 15, a smoothened edge 104 is illustrated that comprises both a chamfering and a fillet. A basically linear leg is indicated by 106. Adjacent to the bottom surface 64, a remaining edge 108 is formed between the bottom surface 64 and the beveled leg 106. An angle α characterizes the inclination between the bottom surface 64 and the leg 106. Adjacent to the side surface 66, a fillet 110 characterized by a radius R is formed.

Further embodiments of fillets and/or bevels that also reduce the risk of hair-pulling due to sharp edges at the stationary blade teeth 44 are conceivable.

Figure 16:
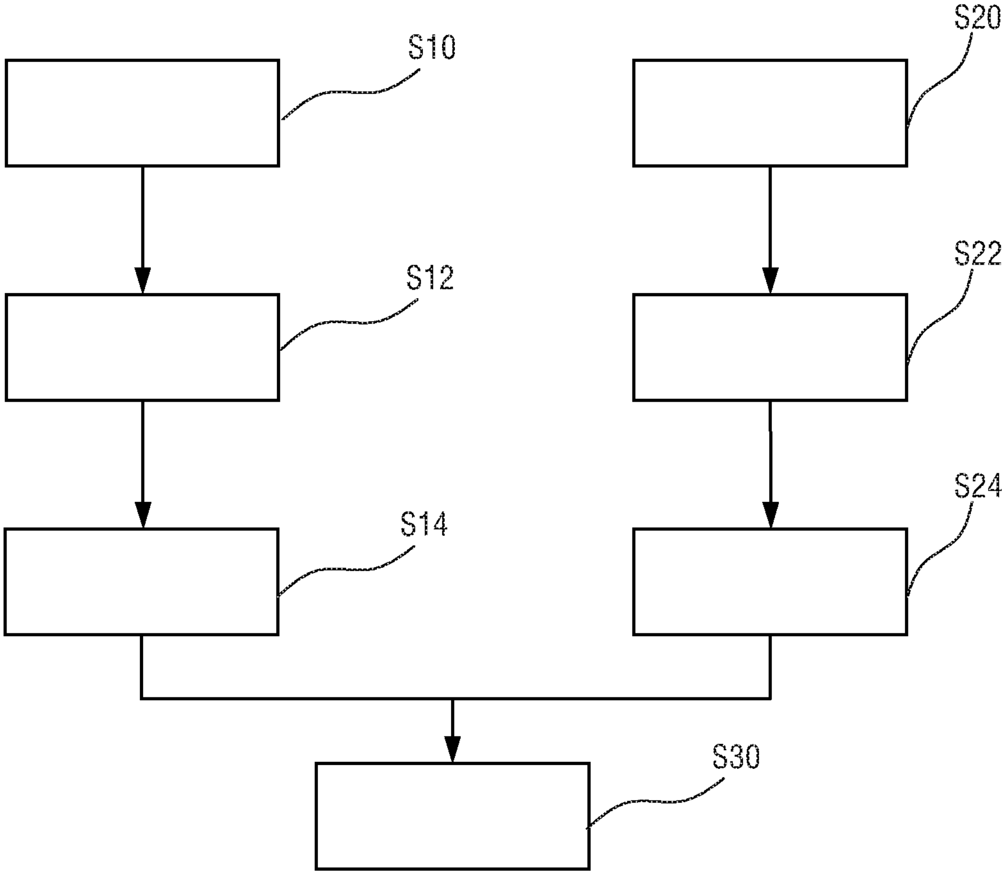
FIG. 16 shows a simplified block diagram of an exemplary embodiment of a method of manufacturing a stationary blade for a blade set, and a blade set involving a stationary blade and a cutter blade.

Further reference is made to FIG. 16, exemplarily illustrating by means of a block diagram an embodiment of a method of forming a blade set for a hair cutting appliance.

The method involves steps S10 to S16 relating to the provision of a stationary blade. The method further involves steps S20 to S26 relating to the provision of a cutter blade In a first step S10, a metal blank for the stationary blade is provided. The metal blank may be obtained through punching, cutting and similar processing steps. The metal blank may be obtained from sheet metal material.

In a further step S12, a blade base and a plurality of teeth extending from the blade base are formed. This includes an arrangement of teeth that alternate with tooth gaps. The series of teeth may involve a linear arrangement of basically parallel teeth, and/or a somewhat curved arrangement, resulting in a curved or even circular leading edge defined by the teeth.

In a further step S14, cutting edges or processing edges of the teeth are processed to form smoothened edge transitions. This may involve chamfering, rounding, etc. Forming the smoothened edge transitions may involve electrochemical machining, thermal machining, mechanical machining, such as grinding, etc. Preferably, the stationary blade obtained in this way is arranged in accordance with at least one embodiment as discussed herein.

It is to be noted that depending on the applied manufacturing process, the steps of forming the teeth and processing the edges may be combined in certain embodiments.

Similarly, in a step S20, a metal blank for the cutter blade is provided. The metal blank may be obtained through punching, cutting and similar processing steps. The metal blank may be obtained from sheet metal material.

In a further step S22, a blade base and a plurality of teeth extending from the blade base are formed. This includes an arrangement of teeth that alternate with tooth gaps. The series of teeth may involve a linear arrangement of basically parallel teeth, and/or a somewhat curved arrangement, resulting in a curved or even circular leading edge defined by the teeth. Generally, the shape and arrangement of the teeth of the cutter blade and the shape and arrangement of the teeth of the stationary blade are adapted to one another to ensure the overall cutting function of the blade set.

In a further step S24, cutting edges or processing edges of the teeth are processed to form relatively sharp edge transitions. However, this may still involve the removal of overly sharp edges, involving deburring, etc. However, in accordance with major aspect of the present disclosure, cutting edges of the teeth of the cutter blade are sharper than cutting/processing edges of the teeth of the stationary blade.

Eventually, in a further step S30 the stationary blade obtained through the steps S10 to S16 and the cutter blade obtained through the steps S20 to S26 are joined to form a blade set for a hair cutting appliance. Preferably, the blade set comprises a so-called tip-to-tip adjustment feature enabling an adjustment operation to adjust the cutting length of the blade set.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

The invention claimed is:

1. A blade set for a hair cutting appliance, comprising a stationary blade and a cutter blade, the stationary blade comprising a blade base and stationary blade teeth extending from the blade base in a longitudinal direction, and the cutter blade comprising cutter blade teeth extending in the longitudinal direction, wherein:

the stationary blade teeth are arranged in parallel alternating with tooth gaps between the stationary blade teeth, the tooth gaps defining hair entry slots, the stationary blade teeth comprise a first side arranged to cooperate with the cutter blade to cut hair and a second side arranged as a skin-facing side, the stationary blade teeth comprise smoothened processing edges at the first side at longitudinal extensions of the stationary blade teeth, the smoothened processing edges comprise smoothened edge transitions, and the cutter blade is provided at the cutter blade teeth with sharp cutting edges in a processing zone, wherein the sharp cutting edges cooperate with the smoothened processing edges of the stationary blade, such that the cutter blade moves with respect to the stationary blade in a lateral direction to cut hair between the sharp cutting edges and the smoothened processing edges, wherein the smoothened edge transitions of the smoothened processing edges comprise in a transition zone one of (i) chamfered and rounded transitions, (ii) chamfered transitions with different obtuse angles between the smoothened processing edges and the first side and between the smoothened processing edges and a side surface of the stationary blade teeth, and (iii) rounded transitions with different obtuse curvatures.

2. The blade set as claimed in claim 1, wherein the smoothened edge transitions of the smoothened processing edges comprise chamfered transitions.

3. The blade set as claimed in claim 2, wherein the chamfered transitions comprise an edge length in a range of 5 to 50 μm.

4. The blade set of claim 2, wherein the chamfered transitions comprise an edge length in a range of 10 to 40 μm.

5. The blade set of claim 2, wherein the chamfered transitions comprise an edge length in a range of 15 to 30 μm.

6. The blade set as claimed in claim 1, wherein the smoothened edge transitions of the smoothened processing edges comprise rounded transitions.

7. The blade set as claimed in claim 6, wherein the rounded transitions have an edge radius in a range of 5 to 50 μm.

8. The blade set of claim 6, wherein the rounded transitions have an edge radius in a range of 10 to 40 μm.

9. The blade set of claim 6, wherein the rounded transitions have an edge radius in a range of 15 to 30 μm.

10. The blade set as claimed in claim 1, wherein the smoothened edge transitions of the smoothened processing edges comprise in the transition zone a first edge involving a first obtuse angle and a second edge involving a second obtuse angle different from the first obtuse angle.

11. The blade set as claimed in claim 1, wherein the smoothened edge transitions of the smoothened processing edges comprise in the transition zone a first edge formed by an obtuse angle and a second edge formed by a rounding.

12. The blade set as claimed in claim 1, wherein the smoothened edge transitions of the smoothened processing edges comprise in the transition zone a first edge involving a first rounding and a second edge involving a second rounding, the first rounding being different from the second rounding.

13. The blade set as claimed in claim 1, wherein the smoothened edge transitions of the smoothened processing edges are provided in a stationary blade processing zone of the longitudinal extensions.

14. The blade set as claimed in claim 1, wherein the stationary blade and the cutter blade are arranged to be displaced with respect to each other in the longitudinal direction to set a cutting length of the hair cutting appliance.

15. A hair cutting appliance, comprising a housing and a cutting head, the cutting head comprising the blade set according to claim 1.

16. A method for forming a stationary blade for a hair cutting appliance, the method comprising acts of:

forming a blade base;

forming stationary blade teeth extending from the blade base in a longitudinal direction such that the stationary blade teeth are arranged in parallel alternating with tooth gaps between the stationary blade teeth, the tooth gaps defining hair entry slots, the stationary blade teeth having a first side arranged to cooperate with a cutter blade to cut hair and a second side arranged as a skin-facing side;

providing the stationary blade teeth with smoothened processing edges at the first side at longitudinal extensions of the stationary blade teeth;

providing the smoothened processing edges with smoothened edge transitions;

wherein the smoothened edge transitions of the smoothened processing edges comprise in a transition zone one of (i) chamfered and rounded transitions, (ii) chamfered transitions with different obtuse angles between the smoothened processing edges and the first side and between the smoothened processing edges and a side surface of the stationary blade teeth, and (iii) rounded transitions with different obtuse curvatures.

17. The method claimed in claim 16, wherein the step of providing the smoothened processing edges with the smoothened edge transitions comprises providing the smoothened edge transitions in the transition zone with a first edge formed by an obtuse angle and a second edge formed by a rounding.

* * * * *